United States Patent
Frappell

(10) Patent No.: US 10,371,236 B2
(45) Date of Patent: Aug. 6, 2019

(54) TENSIONING APPARATUS

(71) Applicant: Christopher Martin Frappell, Uttoxeter (GB)

(72) Inventor: Christopher Martin Frappell, Uttoxeter (GB)

( * ) Notice: Subject to any disclaimer, the term of this patent is extended or adjusted under 35 U.S.C. 154(b) by 140 days.

(21) Appl. No.: 15/514,535

(22) PCT Filed: Sep. 25, 2015

(86) PCT No.: PCT/GB2015/052789
§ 371 (c)(1),
(2) Date: Mar. 27, 2017

(87) PCT Pub. No.: WO2016/051142
PCT Pub. Date: Apr. 7, 2016

(65) Prior Publication Data
US 2017/0219067 A1 Aug. 3, 2017

(30) Foreign Application Priority Data
Sep. 30, 2014 (GB) .................................. 1417198.7

(51) Int. Cl.
*F16H 7/08* (2006.01)

(52) U.S. Cl.
CPC ......... *F16H 7/08* (2013.01); *F16H 2007/088* (2013.01); *F16H 2007/0872* (2013.01); *F16H 2007/0891* (2013.01)

(58) Field of Classification Search
CPC ............... F16H 2007/0891; F16H 7/08; F16H 2007/0872; F16H 2007/0874; B25B 27/0035

USPC .......................................................... 474/111
See application file for complete search history.

(56) References Cited

U.S. PATENT DOCUMENTS

| | | | | |
|---|---|---|---|---|
| 3,889,381 A | * | 6/1975 | Brown | C21D 7/12 33/506 |
| 3,926,063 A | * | 12/1975 | Mayfield | F16H 7/1254 474/132 |
| 4,543,079 A | * | 9/1985 | Matsuda | F16H 7/0836 474/110 |
| 4,798,562 A | * | 1/1989 | Matson | F16H 7/08 474/101 |
| 5,000,724 A | * | 3/1991 | Reid | F16H 7/08 474/111 |
| 5,613,412 A | * | 3/1997 | Dawson | B25B 27/0035 7/100 |

(Continued)

FOREIGN PATENT DOCUMENTS

DE 29803763 U1 7/1998
FR 2490307 A3 3/1982

(Continued)

*Primary Examiner* — Henry Y Liu
(74) *Attorney, Agent, or Firm* — Law Offices of Michael L. Wise, LLC

(57) ABSTRACT

Tensioning apparatus (10, 30, 130) for applying a required tension to a line means (12, 32, 132). A body (14, 34, 134) is provided which provides first (26, 50, 150), second (20, 60, 160) and third (28, 52, 152) parts with contact surfaces engagable with the line means so as to urge the line means from a straight alignment to provide a required tension therein. The second part (60, 62) may be adjustably movable relative to the first (50, 150) and third (52, 152) parts.

17 Claims, 8 Drawing Sheets

(56) References Cited

U.S. PATENT DOCUMENTS

| | | | | |
|---|---|---|---|---|
| 6,068,567 A * | 5/2000 | Thompson | | F16H 7/08 |
| | | | | 474/101 |
| 8,323,136 B2 * | 12/2012 | Heinrich | | F16H 7/08 |
| | | | | 474/110 |
| 2003/0232677 A1 * | 12/2003 | Huang | | F16H 7/08 |
| | | | | 474/101 |
| 2004/0092351 A1 * | 5/2004 | Bergman | | F16H 7/0838 |
| | | | | 474/140 |
| 2005/0192142 A1 * | 9/2005 | Stone | | F01L 1/024 |
| | | | | 474/101 |
| 2005/0255800 A1 * | 11/2005 | Crover | | B23D 45/006 |
| | | | | 451/347 |
| 2006/0055203 A1 * | 3/2006 | Rice | | E05F 15/627 |
| | | | | 296/146.4 |
| 2008/0194364 A1 * | 8/2008 | Greilinger | | B62M 9/16 |
| | | | | 474/101 |
| 2008/0202292 A1 * | 8/2008 | Gilgallon | | B25B 25/00 |
| | | | | 81/57.29 |
| 2009/0241742 A1 * | 10/2009 | Gilgallon | | B25B 25/00 |
| | | | | 81/121.1 |
| 2009/0325748 A1 * | 12/2009 | Pflug | | F16H 7/18 |
| | | | | 474/91 |
| 2013/0090201 A1 * | 4/2013 | Mori | | F16H 7/18 |
| | | | | 474/140 |
| 2017/0097067 A1 * | 4/2017 | Yamamoto | | B62D 3/12 |

FOREIGN PATENT DOCUMENTS

| | | |
|---|---|---|
| JP | H0525054 U | 4/1993 |
| JP | H08285020 A | 11/1996 |
| JP | H08326852 A | 12/1996 |

* cited by examiner

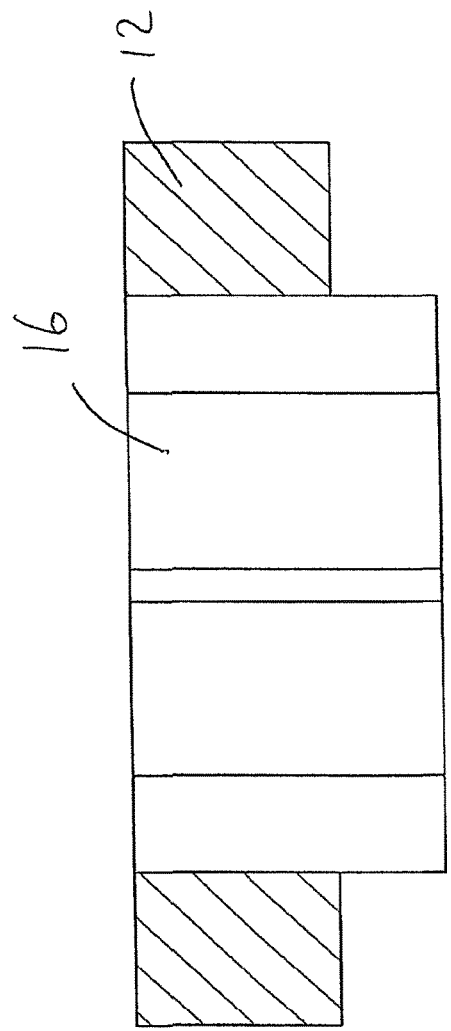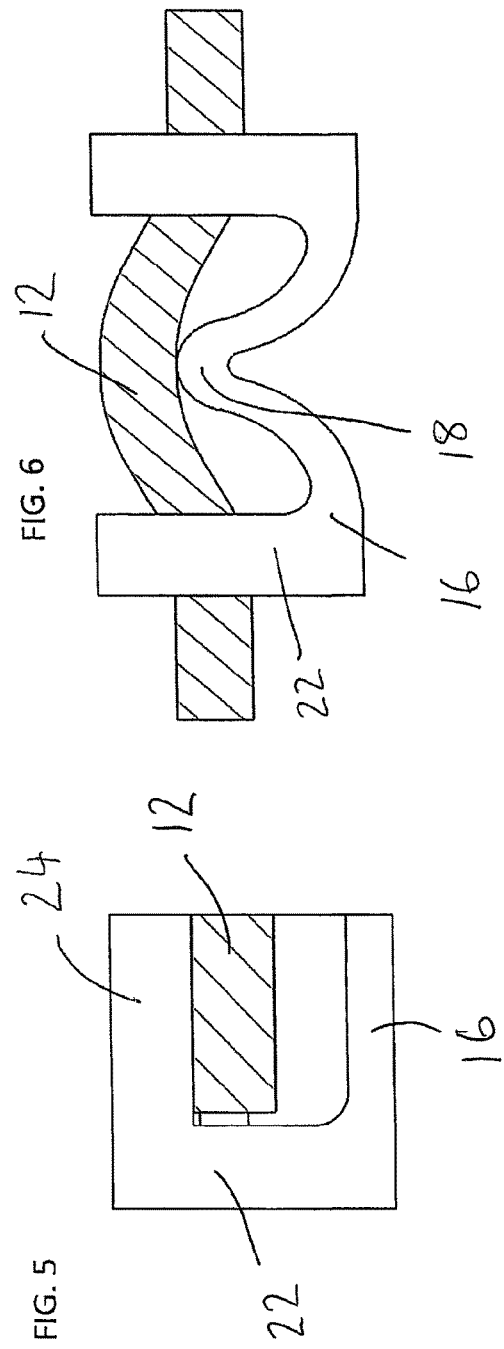

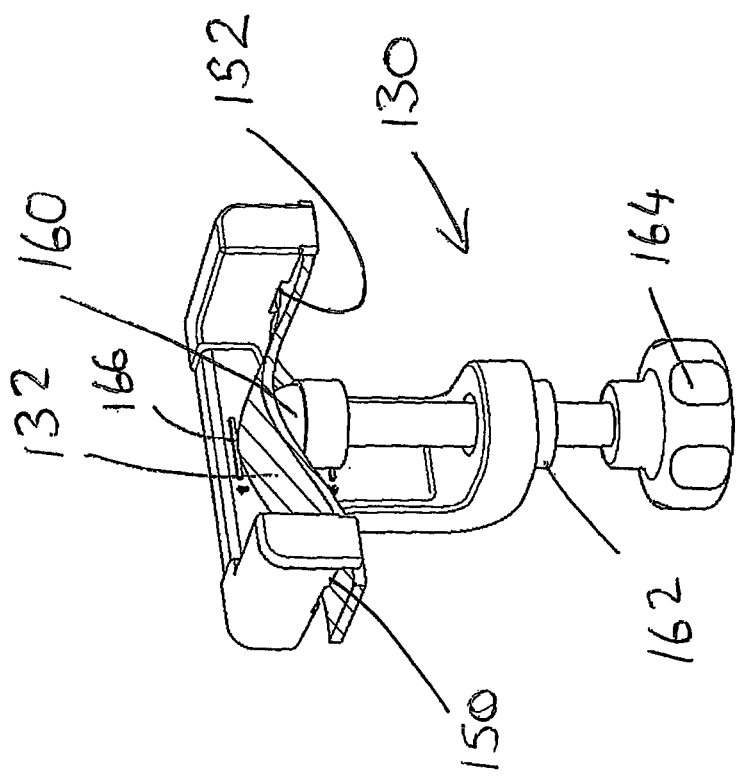
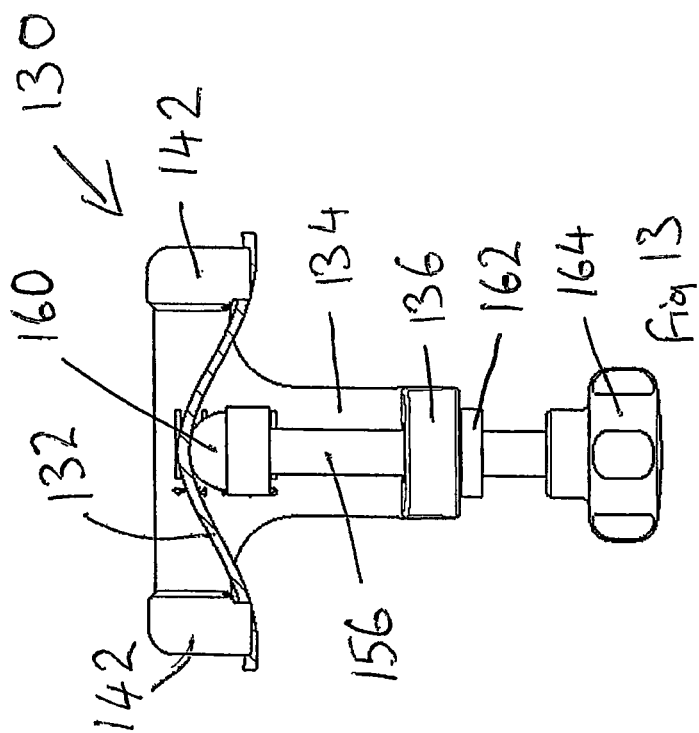

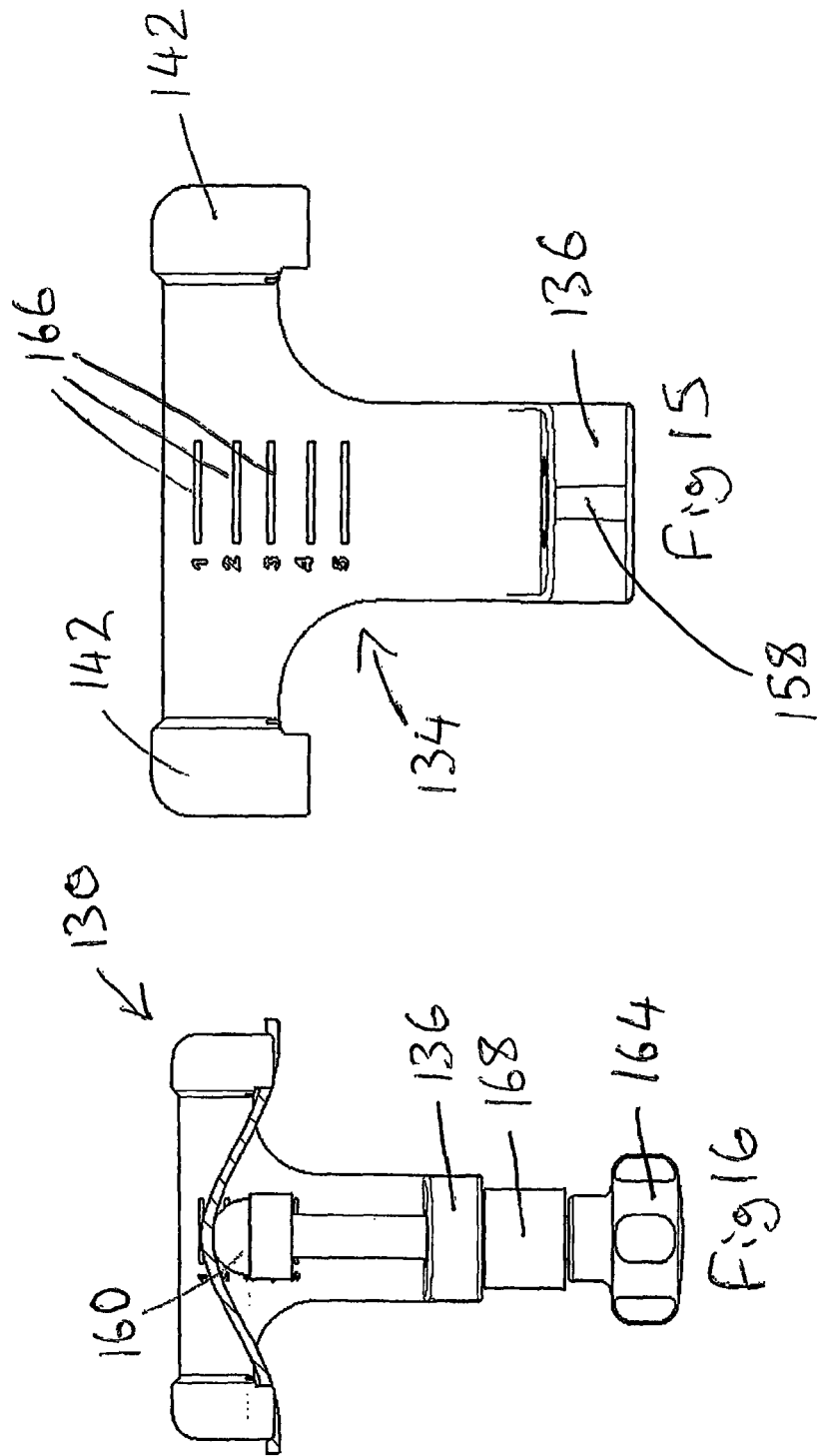

TENSIONING APPARATUS

This invention concerns tensioning apparatus, and especially tensioning apparatus for a line means, and particularly but not exclusively for a line means such as a chain for instance on a vehicle.

It is often required to set a particular tension in a line means such as a drive chain for example in a motorbike, go-kart or other vehicle. In motorbikes it may be that the chain tensions should be checked every 500 miles. Difficulties however can be encountered in trying to set a required tension. For instance with a motorbike it is necessary to correctly position a drive wheel to provide the correct tension whilst retaining a central alignment of the wheel relative to the chassis. In a go-kart it may be necessary to move the motor to provide a correct tension in a drive chain.

If a correct tension is not achieved this can cause damage to components including reducing sprocket life and/or bearing life, engine failure and even snapping of the chain or other line means. If a chain or other line means is too loose, this can cause slippage, again causing potential damage and perhaps lack of control.

According to the present invention there is provided tensioning apparatus for a line means, the apparatus being locatable on the line means with the line means extending therethrough, the apparatus including first, second and third parts which each have a contact surface to provide a point of contact with a line means extending through the apparatus, with the respective relative positions of the first, second and third parts being arranged such that a line means extending through the apparatus from the first to the third parts via the second part, will be urged from a straight alignment between the first and third parts by the second part, to provide a required tension in the line means.

The apparatus may comprise a body, which body provides the first and third parts at a required spacing from each other. The body may be integrally formed.

In a first embodiment the body also provides the second part spaced between the first and third parts and at a required spacing from a line extending between the contact surface of the first and third parts so as to urge a line means extending therebetween from a straight alignment.

In a second embodiment the second part is adjustably mounted on the body, such that the spacing of the second part from a line extending between the contact surfaces of the first and third parts can be varied.

The second part may include an elongate member which is threadingly engageable with the body to permit relative positional adjustment therebetween.

A stop member may be provided on the elongate member which is engageable against the body when the second part is moved to a required position. The stop member may be adjustably mounted on the elongate member so as to be selectively movable along the elongate member for different required positions of the second part. The stop member may be threadingly mounted on the elongate member.

The stop member may be provided on a part of the elongate member on an opposite side of the body from the contact surface, such that the second part can be moved between a required position in which the stop member engages against the body, and a position with less spacing of the second part from a line extending between the contact surfaces of the first and third parts.

A plurality of different length stop members may be provided, such that a particular length stop member can be chosen and mounted on the elongate member, to provide a required tension in the line means.

A handle may be provided on the second part to facilitate rotation thereof, and the handle may be provided on an opposite end of the second part to the contact surface.

The first, second and/or third contact surfaces may be curved and may be convex.

A channel may be provided in the first and/or third parts to receive a line means extending thereacross. A plurality of colinear channels of different widths may be provided on the first and/or third parts. A lip may be provided on the first and/or third parts to retain a line means extending thereacross.

The body may be made of any of aluminium, ABS plastics material, or nylon, and may be made of lubricated nylon.

The body may include a base, with the first and third parts extending from spaced locations on the base, and the first and third parts may extend from opposite ends of the base.

The first and third parts may include spacing parts extending from the base, and facing parts extending from the spacing parts with the contact surfaces on the facing parts facing towards the base and spaced therefrom. The base may provide the second part which may be equispaced between the first and third parts.

In the first embodiment the second part may comprise a projecting portion of the base extending away from the remainder of the base towards the first and third parts.

In the second embodiment the second part may be adjustably mounted on the base.

Markings may be provided on the body with which an adjustably movable part of the apparatus is alignable, such that which marking the adjustably movable part is aligned with, will indicate the tension in a line means extending through the apparatus. A part of the second part may be alignable with the markings.

Embodiments of the present invention will now be described by way of example only and with reference to the accompanying drawings, in which:—

FIG. 4 is a diagrammatic view from below of the apparatus of FIG. 1;

FIG. 5 is a diagrammatic end view of the apparatus of FIG. 1;

FIG. 6 is a diagrammatic rear view of the apparatus of FIG. 1;

FIG. 13 is a diagrammatic front view of a third apparatus according to the invention in use;

FIG. 14 is a diagrammatic perspective view of the apparatus of FIG. 13;

FIG. 15 is a diagrammatic front view of part of the apparatus of FIG. 13; and

FIG. 16 is a diagrammatic front view of the apparatus of FIG. 13 but with a different part fitted to it.

FIGS. 1 to 6 show a first tensioning apparatus 10 suitable for use in applying a required tension to a line means part of which is shown diagrammatically as 12, such as the drive chain in a motorbike, go-kart or other vehicle.

Figure 1:
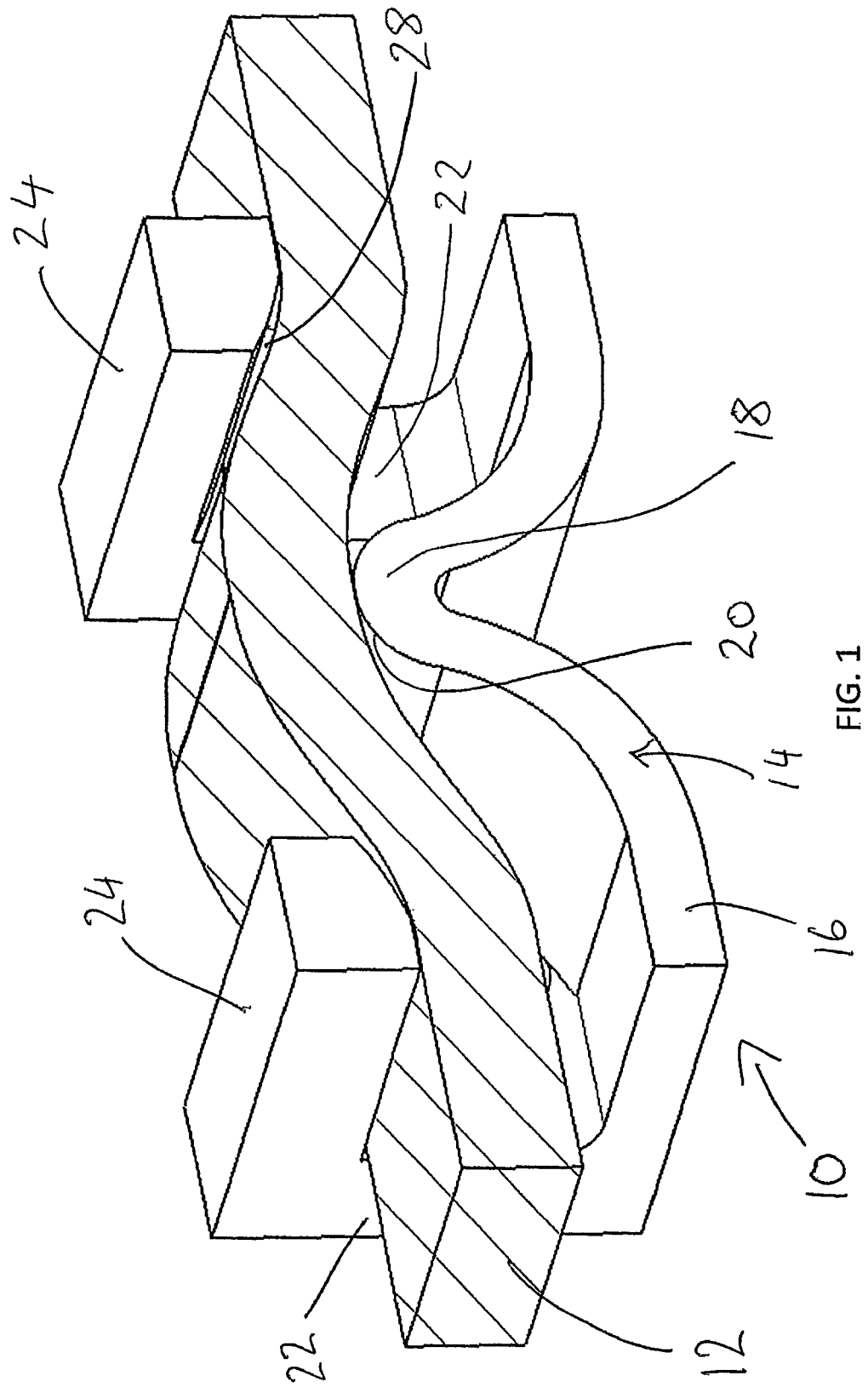
FIG. 1 is a diagrammatic perspective view of a first tensioning apparatus according to the invention in use.
Figure 2:
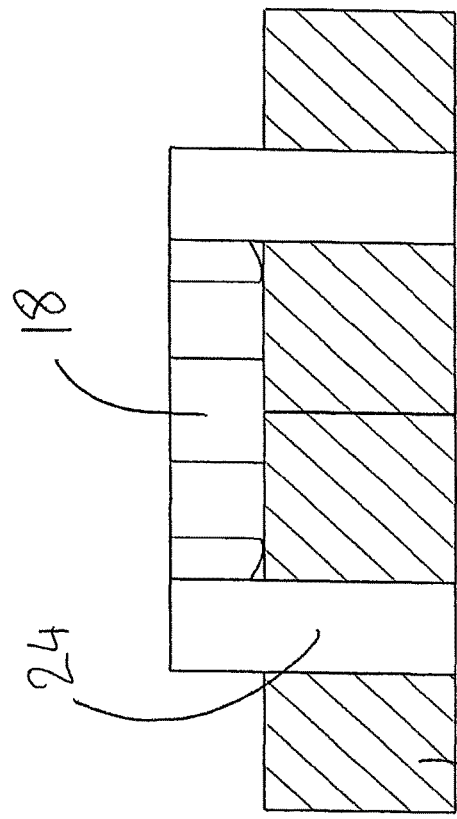
FIG. 2 is a diagrammatic view from above of the apparatus of FIG. 1.
Figure 3:
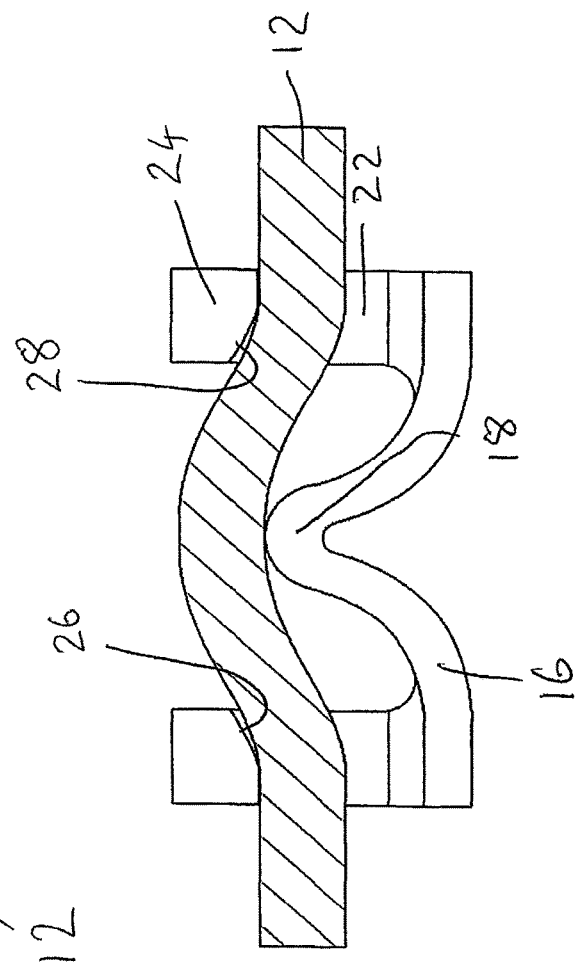
FIG. 3 is a diagrammatic front view of the apparatus of FIG. 1.

The apparatus 10 comprises an integral body 14 which may be made for instance of lubricated nylon. The body comprises a base 16 which in the section has an upstanding projection 18 with a convex upper surface 20 which provides a second part with a curved contact surface.

Extending from the base 16 at each end and from one side of the base are a pair of spacing parts 22. At the ends of the spacing parts 22 spaced from the base 16 are respective facing parts 24 which extend over the base 16, spaced therefrom. The underside of the facing parts 24 is curved and provides respective first and third contact surfaces 26, 28.

In use to provide a required tension in the line means 12 for instance in a motorcycle drive chain, the chain would generally be slackened off at a rear wheel. The apparatus 10 can then be located on the line means 12 as shown in the drawings with the line means 12 extending between the first and third parts provided by the facing parts 24, past the second part 20, and engaging with the first, second and third contact surfaces 26, 20, 28.

As can be seen the second contact surface 20 urges the line means 12 from a straight alignment between the first and third contact surfaces, thereby applying a required tension thereto. The position of the motorcycle rear wheel can then be adjusted until the line means 12 is taught, and then locked in position. The apparatus 10 can then be slid off the line means 12, and use of lubricated nylon in the material of the body 14 aids this removal process.

It is to be realised that different such apparatus could be provided to provide different amounts of tension, with the configuration of the first, second and third contact surfaces being arranged to provide the required amount of deflection from a straight line of the line means. An appropriate such tensioning apparatus could be supplied for instance with new vehicles, or supplied for use with particular vehicles.

Figure 7:
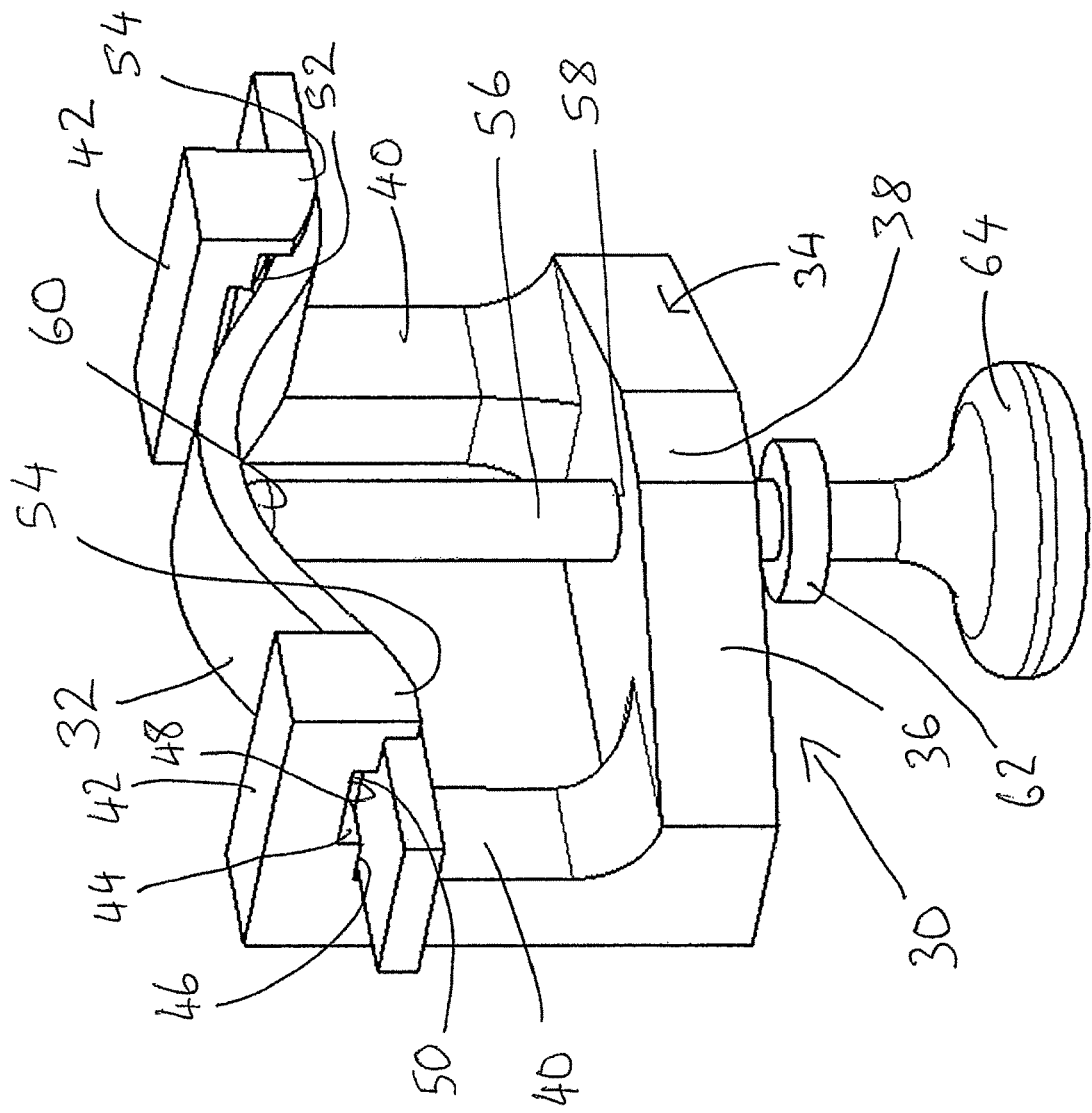
FIGS. 7 to 12 are respective diagrammatic views of a second apparatus according to the invention in use, in corresponding views respectively to FIGS. 1 to 6.
Figure 8:
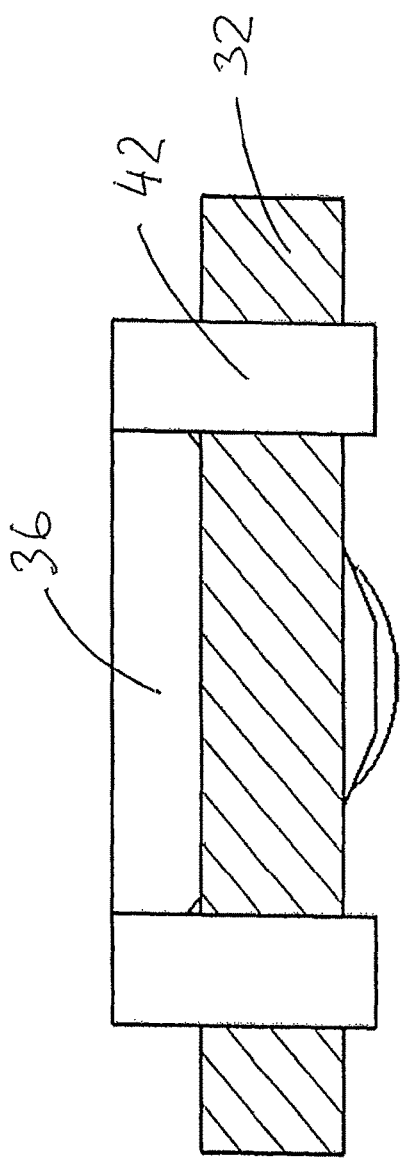
Figure 9:
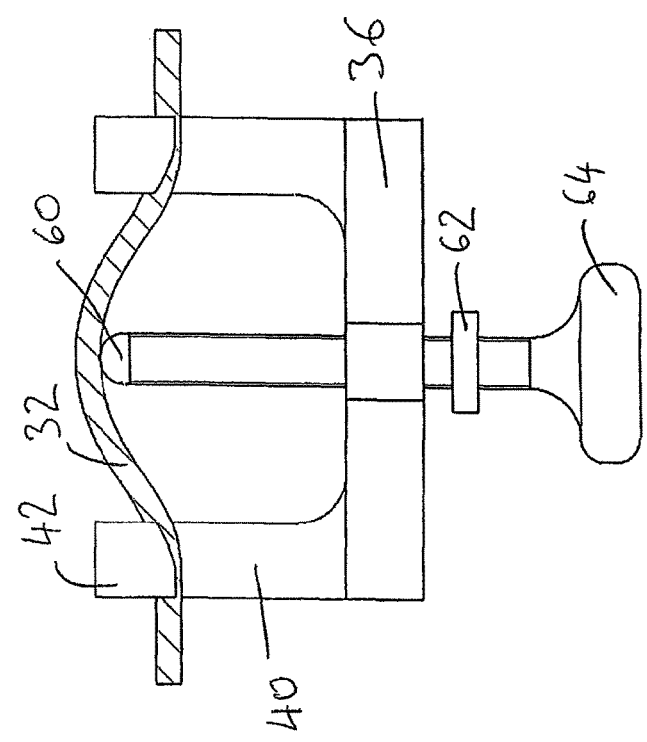
Figure 11:
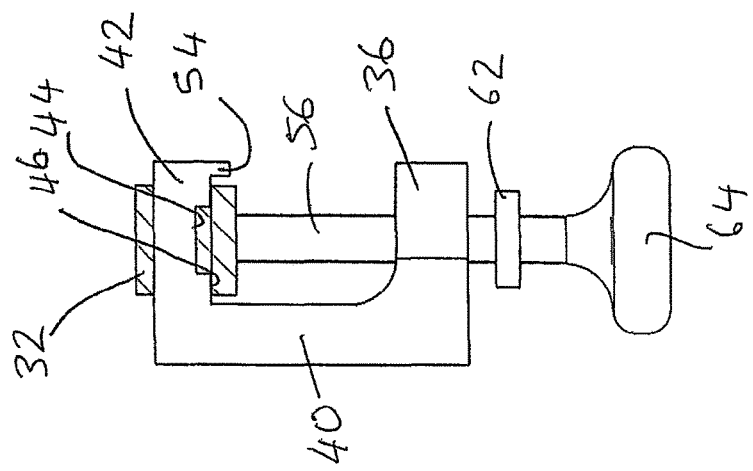
Figure 10:
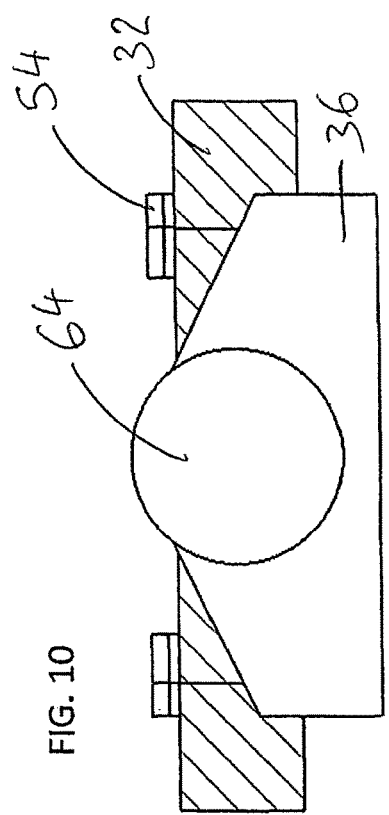
Figure 12:
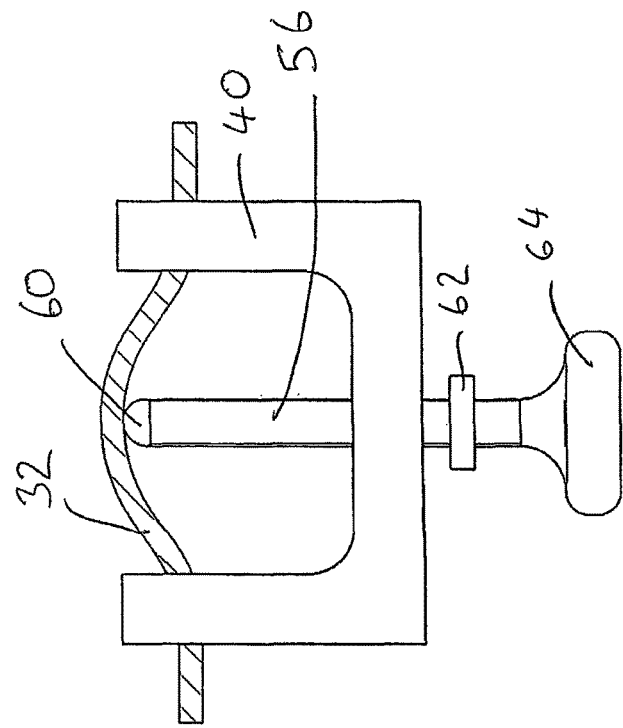

FIGS. 7 to 12 show a second tensioning apparatus 30 which operates in a similar manner to the apparatus 10, but is adjustable such that the same apparatus 30 can be used to provide different amounts of tension in a line means, as required. The apparatus 30 is again shown diagrammatically with a line means 32 having tension applied thereto.

The apparatus 30 again includes a body 34 which again may be made of nylon, or could be made of other materials such as ABS plastics material or aluminium. The body has a base 36, but in this instance the base 36 is planar and has a wider central portion 38 and tapers towards each end from which respective spacing parts 40 extend. Again facing parts 42 extend from the spacing parts 40, but in this instance two colinear channels 44, 46 are provided in the part 48 of the facing part 42 facing the base 36.

The part 48 provides respective first and third contact surfaces 50, 52. The contact surfaces 50, 52 are curved, and are curved away from the base 36 away from the ends of the base 36. The channels 44, 46 are of a size to locate a line means, and as shown in this instance the larger outer channel 46 slidingly locates the line means 32. A lip 54 is provided on the distal ends of the facing parts 42 to retain a line means 32 in place.

The second contact surface is provided by a threaded elongate bar 56 which threadingly locates through a hole 58 centrally in the base 36. A rounded convex end 60 is provided on the bar 56 on the same side of the base 36 as the spacing parts 40, and the end 60 provides the second contact surface.

A stop member 62 is provided on the elongate bar 56 on an opposite side of the base 36 to the spacing parts 40. The stop member 62 is adjustably mounted on the elongate bar 56 and can be located at a required position thereon. The stop member 62 may be in the form of a washer or other member which can be slid into position on the bar 56. Alternatively the stop member 62 may be threaded, and may be in the form of a nut. The stop member 62 can then be rotatingly moved along the bar 56 to a required position. A circular handle 64 is provided at the opposite end of the elongate bar 56 to the end 60.

In use the stop member 62 can be provided on the elongate bar 56 at a required position for a predetermined tension in the line means 32. A scale could be provided for instance indicating the required distance for a particular tension in the line means 32 for a particular size of line means, from the handle 64 to the stop member 62.

Again for instance for use with a motorbike the chain can be loosened and the apparatus 30 located on the chain. To ease location of the apparatus thereon, the position of the bar 56 can be adjusted such that the end 60 is as close to the base 36 as possible. The chain will be positioned to locate in a required one of the channels 44, 46. The handle 64 can then be rotated to move the elongate bar 56 until the stop member 62 engages against the base 36, and hence the end 60 and second contact surface is at a required position to urge the line means from a straight line between the first and third contact surfaces 50, 52.

The chain can then be secured in position with the required tension. The handle 64 can then again be turned to move the second contact surface 60 away from the first and third contact surfaces 50, 52 to loosen the apparatus 30 on the chain to permit removal therefrom.

FIGS. 13 to 16 show a third tensioning apparatus 130 which is similar in most respects to the second tensioning apparatus 30. Accordingly the apparatus 130 will not be described in detail, and corresponding components in the third tensioning apparatus 130 are given similar reference numerals to those in the apparatus 30, but with the prefix 100. The body 134 may be made of similar materials, but has a somewhat different shape. In this instance the body 134 has a generally T shape with the base 136 provided by the base of the stem of the T. The facing parts 142 are provided on respective ends of the crossbar of the T.

Again a threaded elongate bar 156 threadingly locates through a hole 158 in the base 136. A domed nut 160 is provided on the end of the bar 156 to provide the second contact surface. A stop member 162 is again provided which again may be in the form of a washer or nut, which can be moved along the bar 156 to a required position. The stop member 162 is engagable against the end of the base 136 facing away from the remainder of the body 134. A profiled handle 164 is provided on the end of the bar 156 to facilitate turning thereof.

As can be seen particularly in FIG. 15, markings 166, in this instance a number of parallel lines numbered 1 to 5 are provided on the body 134, centrally between the two facing parts 142. In use the base of the domed nut 162 is alignable with one of the lines to provide the required tension in the line means 132. For instance usable with motorcycle chains, the lower most line 5 equates to 0.5-1.0 inches of travel (12.7-25.4 mm), and line 4 equates to 1.1-1.5 inches of travel (7.94-38.1 mm). This will change slightly depending upon the height of the chain in use, and details of this will be provided to the user.

In FIG. 16 rather than the adjustable stop member 162, a fixed stop member 168 is provided. The fixed stop member 168 is in the form of a sleeve of a required length to fit around the bar 156 on the outer side of the base 136, to engage between the base 136 and handle 164 when the domed nut 160 has reached a required position. It is to be realised that different lengths of fixed stop members 168 could be provided for different required tensions, and a range of different length fixed stop members 168 could be provided with the apparatus 130 for providing different required tensions.

There is thus described tensioning apparatus in different forms which readily permit a line means such as a chain to be adjusted to a required tension. The apparatus can then readily be removed for subsequent re-use. In the first form a particular apparatus can be provided for instance for a particular vehicle or situation, and a range of different apparatus could be made available. In the other forms the same apparatus can be used to provide different amounts of tension, with a clear way of readily adjusting the apparatus to provide the required tension.

The apparatus is of quite straightforward construction and can thus be inexpensively and robustly manufactured for repeated use and storage over a long period. Whilst being of relatively simple construction, the apparatus can provide accurate adjustment of the tension in a line means.

It is to be realised that a wide range of other modifications may be made without departing from the scope of the invention, and any of the above features can be combined as required. For instance the apparatus may take a different shape and/or configuration, and could be made of different materials. The movable second contact surface could be provided differently, and could be movable by other means.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Tensioning apparatus for a line means, the apparatus being locatable on the line means with the line means extending therethrough, the apparatus including first, second and third parts which each have a contact surface to provide a point of contact with a line means extending through the apparatus, with the respective relative positions of the first, second and third parts being arranged such that a line means extending through the apparatus from the first to the third parts via the second part, will be urged from a straight alignment between the first and third parts by the second part, to provide a required tension in the line means, and in which the second part is adjustably mounted on a body that provides the first and third parts at required spacing from each other, and the second part includes an elongate member which is threadingly engageable with the body to permit relative positional adjustment therebetween such that a spacing of the second part from a line extending between the contact surfaces of the first and third parts can be varied.

2. Apparatus according to claim 1, in which the body is integrally formed.

3. Apparatus according to claim 1, in which a stop member is provided on the elongate member which is engageable against the body when the second part is moved to a required position.

4. Apparatus according to claim 3, in which the stop member is adjustably mounted on the elongate member so as to be selectively movable along the elongate member for different required positions of the second part, and the stop member is threadingly mounted on the elongate member.

5. Apparatus according to claim 3, in which the stop member is provided on a part of the elongate member on an opposite side of the body from the contact surface, such that the second part can be moved between a required position in which the stop member engages against the body, and a position with less spacing of the second part from a line extending between the contact surfaces of the first and third parts.

6. Apparatus according to claim 3, in which a plurality of different length stop members are provided, such that a particular length stop member can be chosen and mounted on the elongate member, to provide a required tension in the line means.

7. Apparatus according to claim 1, in which a handle is provided on the second part to facilitate rotation thereof, and the handle is provided on an opposite end of the second part to the contact surface.

8. Apparatus according to claim 1, in which the first, second and/or third contact surfaces are curved and are convex.

9. Apparatus according to claim 1, in which a channel is provided in the first and/or third parts to receive a line means extending thereacross, and a plurality of colinear channels of different width are provided on the first and/or third parts.

10. Apparatus according to claim 1, in which a lip is provided on the first and/or third parts to retain a line means extending thereacross.

11. Apparatus according to claim 1, in which the body is made of any of aluminium, ABS plastics material, or nylon.

12. Apparatus according to claim 1, in which the body includes a base, with the first and third parts extending from spaced locations on the base, the first and third parts extending from opposite ends of the base, and the first and third parts including spacing parts extending from the base, and facing parts extending from the spacing parts with the contact surfaces on the facing parts facing towards the base and spaced therefrom.

13. Apparatus according to claim 12, in which the base provides the second part, and the second part comprises a projecting portion of the base extending away from the remainder of the base towards the first and third parts.

14. Apparatus according to claim 12, in which the second part is adjustably mounted on the base.

15. Apparatus according to claim 1, in which markings are provided on the body with which an adjustably movable part of the apparatus is alignable, such that which marking the adjustably movable part is aligned with will indicate the tension in a line means extending through the apparatus.

16. Apparatus according to claim 15, in which part of the second part is alignable with the markings.

17. Apparatus according to claim 1, in which the second part is equispaced between the first and third parts.

* * * * *